(12) United States Patent
Sato et al.

(10) Patent No.: US 10,778,899 B2
(45) Date of Patent: Sep. 15, 2020

(54) CAMERA CONTROL APPARATUS (71) Applicant: Panasonic Intellectual Property Management Co., Ltd., Osaka (JP)

(72) Inventors: Daiki Sato, Kyoto (JP); Keijiroh Nagano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 15/705,214

(22) Filed: Sep. 14, 2017

(65) Prior Publication Data

US 2018/0007282 A1 Jan. 4, 2018

Related U.S. Application Data

(63) Continuation of application No. PCT/JP2017/003776, filed on Feb. 2, 2017.

(30) Foreign Application Priority Data

Mar. 30, 2016 (JP) .................................. 2016-068445

(51) Int. Cl.
*H04N 5/232* (2006.01)
*G06K 9/00* (2006.01)
(Continued)

(52) U.S. Cl.
CPC ......... *H04N 5/23296* (2013.01); *G03B 15/00* (2013.01); *G03B 17/38* (2013.01);
(Continued)

(58) Field of Classification Search
CPC .. H04N 5/23296; H04N 5/247; H04N 5/2258; H04N 5/23229; H04N 5/232;
(Continued)

(56) References Cited

U.S. PATENT DOCUMENTS 7,456,847 B2 * 11/2008 Krajec .................. G01S 5/0257
340/901
2003/0032436 A1 2/2003 Mikuni
(Continued)

FOREIGN PATENT DOCUMENTS

JP 11-008843 1/1999
JP 2003-121195 4/2003
(Continued)

OTHER PUBLICATIONS

International Search Report of PCT application No. PCT/JP2017/003776 dated Apr. 25, 2017.

*Primary Examiner* — Mulugeta Mengesha
*Assistant Examiner* — Alazar Tilahun
(74) *Attorney, Agent, or Firm* — Wenderoth, Lind & Ponack, L.L.P.

(57) ABSTRACT

A camera control apparatus of the present disclosure includes an interface and a controller. The interface receives first image data generated by a first camera performing image capturing, second image data generated by a second camera performing image capturing, and altitude information relating to altitude, the altitude information being output by an altitude sensor, and transmits a drive signal to a first actuator capable of changing an image capturing direction of the first camera and to a second actuator capable of changing an image capturing direction of the second camera. The controller outputs the drive signal driving at least one of the first actuator and the second actuator to the interface so that an image capturing region of composite image data in which the first image data and the second image data are combined is narrower when the altitude indicated by the altitude information is lower.

1 Claim, 7 Drawing Sheets

ALTITUDE: LOW (51) Int. Cl.
  *G03B 15/00*  (2006.01)
  *H04N 7/18*  (2006.01)
  *H04N 5/247*  (2006.01)
  *G03B 17/38*  (2006.01)
  *H04N 5/225*  (2006.01)
  *G03B 17/56*  (2006.01)

(52) U.S. Cl.
  CPC ......... *G03B 17/561* (2013.01); *G06K 9/0063* (2013.01); *H04N 5/2258* (2013.01); *H04N 5/232* (2013.01); *H04N 5/23229* (2013.01); *H04N 5/247* (2013.01); *H04N 7/18* (2013.01); *G03B 2206/00* (2013.01)

(58) Field of Classification Search
  CPC ........ H04N 7/18; G03B 17/38; G03B 17/561; G03B 15/00; G03B 2206/00; G06K 9/0063
  See application file for complete search history.

(56) References Cited

U.S. PATENT DOCUMENTS

| | | |
|---|---|---|
| 2003/0103149 A1 | 6/2003 | Kinjo et al. |
| 2005/0219361 A1 | 10/2005 | Aoki et al. |
| 2005/0278753 A1* | 12/2005 | Brady, Jr. ............. H04H 20/62 725/76 |
| 2016/0088287 A1* | 3/2016 | Sadi .................... H04N 13/254 348/43 |

FOREIGN PATENT DOCUMENTS

| | | |
|---|---|---|
| JP | 2003-289465 | 10/2003 |
| JP | 2006-304342 | 11/2006 |
| JP | 2013-117649 | 6/2013 |

* cited by examiner

| Landmark name | Latitude, Longitude |
|---|---|
| Mt. AB | (xa° ya' za" north latitude, xb° yb' zb" east longitude) |
| CD Tower | (xc° yc' zc" north latitude, xd° yd' zd" east longitude) |
| ⋮ | ⋮ |

CAMERA CONTROL APPARATUS

BACKGROUND

Technical Field

The present disclosure relates to a camera control apparatus in transport facilities, such as aircraft and trains, for controlling cameras that capture external video images.

Description of Related Art

Japanese Patent Unexamined Publication No. H11-8843 discloses a structure for adjusting zooming levels and camera-to-camera angles of a plurality of cameras according to an angle of view specified by an operator's manipulation or an input from an external device. This configuration makes it possible to perform wide-range and detailed visual observation without causing duplication or lack of displayed images.

SUMMARY

The present disclosure provides a camera control apparatus that makes it possible to perform image capturing with an appropriate angle of view.

A camera control apparatus of the present disclosure includes an interface and a controller. The interface receives first image data generated by a first camera performing image capturing, second image data generated by a second camera performing image capturing, and altitude information relating to altitude, the altitude information being output by an altitude sensor, and transmits a drive signal to a first actuator capable of changing an image capturing direction of the first camera and to a second actuator capable of changing an image capturing direction of the second camera. The controller outputs the drive signal driving at least one of the first actuator and the second actuator to the interface so that an image capturing region of composite image data in which the first image data and the second image data are combined is narrower when the altitude indicated by the altitude information is lower.

A camera control apparatus according to another aspect of the present disclosure includes an interface, a geographic information database, and a controller. The interface receives first image data generated by a first camera performing image capturing, second image data generated by a second camera performing image capturing, positional information relating to a current position, the positional information being output by a position sensor, and azimuth information being output by a compass, and transmits a drive signal to a first actuator capable of changing an image capturing direction of the first camera and to a second actuator capable of changing an image capturing direction of the second camera. The geographic information database retains landmark information relating to positions of landmarks. The controller identifies one of the landmarks which is positioned within a predetermined range relative to the current position, based on the positional information, the azimuth information, and the landmark information acquired from the geographic information database. Then, the controller outputs the drive signal driving at least one of the first actuator and the second actuator so that a position of the identified landmark is contained in at least one of an image capturing region of the first camera and an image capturing region of the second camera.

The camera control apparatus of the present disclosure is effective to perform image capturing with an appropriate angle of view.

DETAILED DESCRIPTION

Hereinbelow, exemplary embodiments will be described in detail with reference to the drawings. However, unnecessarily detailed description may be omitted. For example, detailed description of well-known matters and repetitive description of substantially the same structures may be omitted. This is to prevent the following description from becoming redundant and to facilitate understanding for those skilled in the art.

It should be noted that the appended drawings and the following description are provided for those skilled in the art to sufficiently understand the present disclosure, and they are not intended to limit the subject matter set forth in the claims.

First Exemplary Embodiment

Hereinbelow, a first exemplary embodiment will be described with reference to FIGS. 1 to 5.

1-1 Configuration

Figure 1:
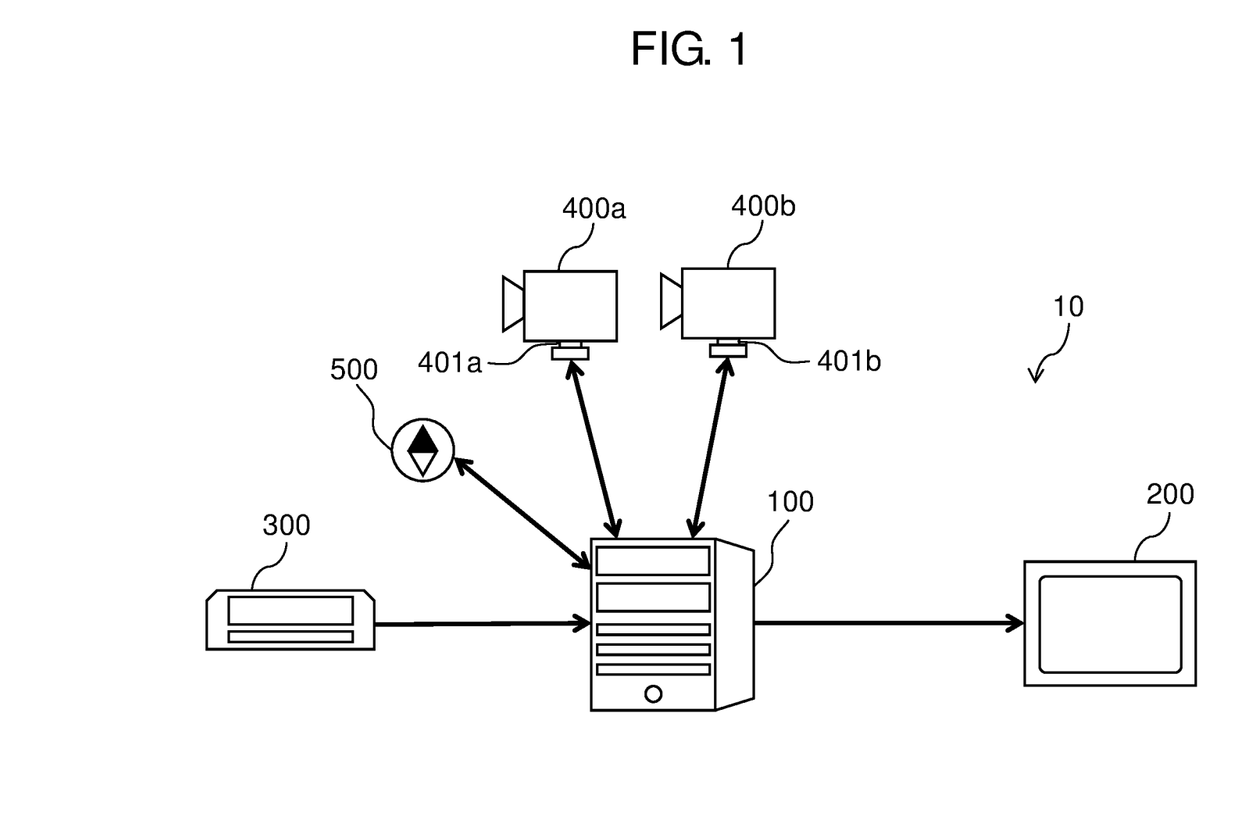
FIG. 1 is a view illustrating the configuration of an in-flight system according to a first exemplary embodiment.

FIG. 1 is a view illustrating the configuration of in-flight system 10 according to the first exemplary embodiment. In-flight system 10 of the present exemplary embodiment is provided inside an aircraft. In-flight system 10 captures images of a landscape external to the aircraft when the aircraft is flying an airway, to acquire image data. In-flight system 10 changes orientations of cameras based on the altitude information of the aircraft.

In-flight system 10 is furnished with server apparatus 100, monitor 200, GPS module 300, first camera 400a, second camera 400b, and compass 500. Server apparatus 100 is connected to monitor 200, and it transmits image data to monitor 200. Monitor 200 is fitted in a passenger cabin of the aircraft. Monitor 200 is capable of displaying video images based on the image data received from server apparatus 100. GPS module 300 acquires latitude-and-longitude information that indicates the current position of the aircraft and altitude information that indicates the current altitude of the aircraft, and it transmits the latitude-and-longitude information and the altitude information to server apparatus 100.

First camera 400a generates image data by performing an image capturing operation and outputs the image data to server apparatus 100. First camera 400a is furnished with first actuator 401a. First actuator 401a changes an image capturing direction of first camera 400a based on the data received from server apparatus 100. Server apparatus 100 controls first actuator 401a to thereby enable first camera 400a to pan (rotate in yawing directions) and tilt (rotate in pitching directions).

Second camera 400b generates image data by performing an image capturing operation and outputs the image data to server apparatus 100. Second camera 400b is furnished with second actuator 401b. Second actuator 401b changes an image capturing direction of second camera 400b based on the data received from server apparatus 100. Server apparatus 100 controls second actuator 401b to thereby enable second camera 400b to pan (rotate in yawing directions) and tilt (rotate in pitching directions).

Compass 500 acquires azimuth information indicating the current azimuth of the aircraft and transmits the azimuth information to server apparatus 100. The azimuth information is information that indicates an azimuth on which the aircraft is heading.

Figure 2:
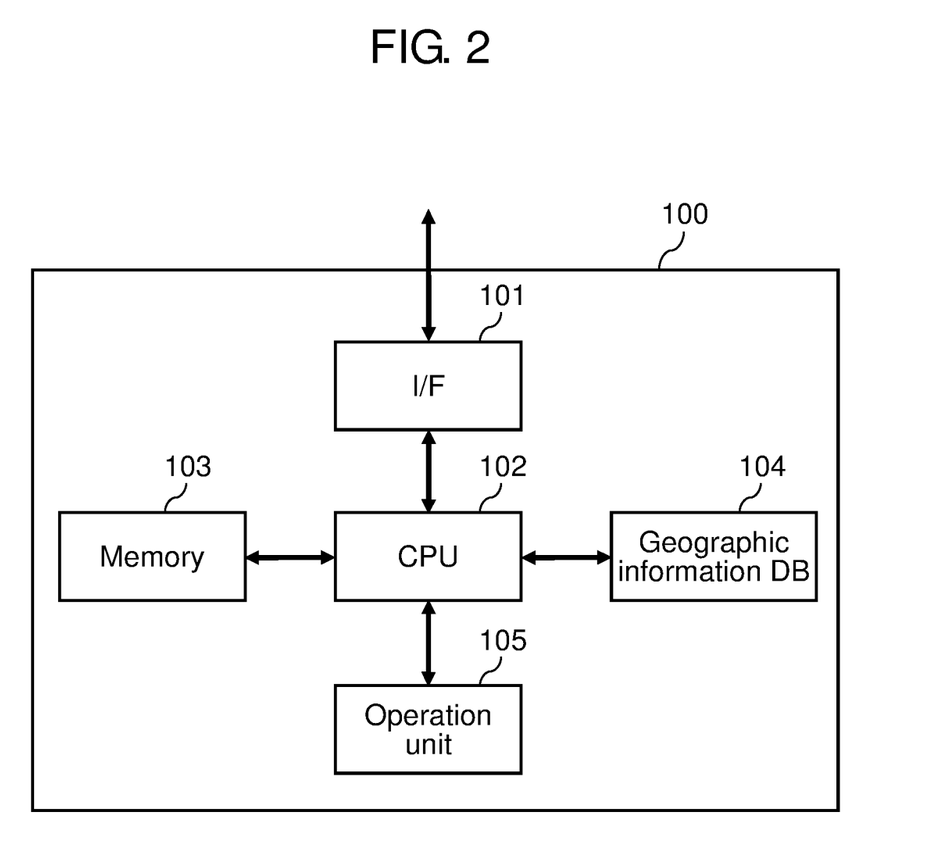
FIG. 2 is a view illustrating the configuration of a server apparatus in the first exemplary embodiment.

FIG. 2 is a view illustrating the configuration of server apparatus 100. Server apparatus 100 is furnished with interface (I/F) 101, CPU 102, memory 103, geographic information database (DB) 104, and operation unit 105. The present exemplary embodiment describes an example in which geographic information database 104 is connected to the interior of server apparatus 100. However, it is only necessary that the geographic information database 104 should be configured so that it can be read and written by CPU 102. For example, it is possible that the geographic information database may be disposed external to server apparatus 100 and connected to interface 101 of server apparatus 100. It is also possible that the geographic information database may be disposed in a data center that is external to the aircraft (i.e., on the ground) and may be capable of communicating with server apparatus 100 via wireless communication.

CPU 102 executes programs stored in memory 103 to perform various processing such as arithmetic operations and information processing. CPU 102 is capable of reading and writing data from and into geographic information database 104. CPU 102 also carries out communications with monitor 200, GPS module 300, first camera 400a, second camera 400b, and compass 500, via interface 101.

In particular, CPU 102 drives first actuator 401a of first camera 400a and second actuator 401b of second camera 400b by transmitting a drive signal to first actuator 401a and second actuator 401b, to thereby control the image capturing directions of first camera 400a and second camera 400b. CPU 102 manages the image capturing direction of first camera 400a as first directional information. CPU 102 also manages the image capturing direction of second camera 400b as second directional information. The first directional information and the second directional information are information indicating relative directions to the aircraft in which first camera 400a and second camera 400b are installed.

CPU 102 acquires information from GPS module 300 and geographic information database 104, combines image data acquired from first camera 400a and second camera 400b by carrying out image processing on the image data, and transmits the combined image data to monitor 200. CPU 102 receives signals from operation unit 105 and performs various operations in response to the received signals. In particular, CPU 102 controls the start and end of image capturing operations of first camera 400a and second camera 400b based on the signals from operation unit 105.

Memory 103 stores, for example, programs to be executed by CPU 102, image data generated by first camera 400a and second camera 400b that perform image capturing, computation results of CPU 102, and information acquired from geographic information database 104. Memory 103 may be composed of a flash memory or a RAM.

Interface 101 receives first image data generated by first camera 400a that performs image capturing, second image data generated by second camera 400b that performs image capturing, latitude-and-longitude information being output by GPS module 300, and azimuth information being output by compass 500, and transmits the received data and information to CPU 102. In addition, interface 101 transmits a drive signal that is output by CPU 102 to first actuator 401a and second actuator 401b.

Geographic information database 104 is a database for retaining information relating to landmarks on a map (landmark information). The landmark information is information that indicates specific points of location on a map. It should be noted that a landmark is also referred to as a point of interest (POI). The geographic information database 104 is composed of, for example, a hard disk drive.

Figure 3:
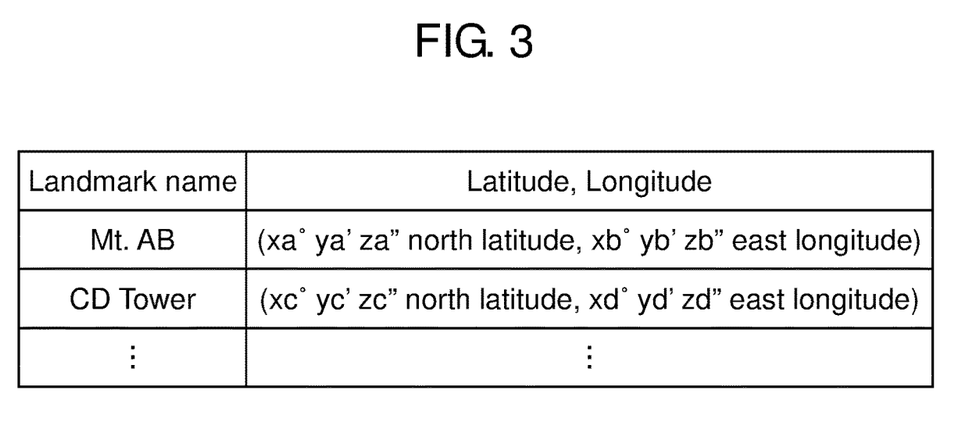
FIG. 3 is a view illustrating data contents of a geographic information database in the first exemplary embodiment.

FIG. 3 is a view illustrating a specific example of data contents of geographic information database 104. Geographic information database 104 retains a plurality of sets of landmark information, each set containing a landmark name and its latitude and longitude (geographic information) indicating the global position of the landmark.

Operation unit 105 is a user interface for accepting input from a user (such as a cabin crew of the aircraft). Operation unit 105 is fitted in the passenger cabin of the aircraft. Operation unit 105 is composed of at least one of a keyboard, a mouse, a touchscreen, and a remote control. When operated by a user, operation unit 105 transmits a signal corresponding to the operation to CPU 102.

In-flight system 10 is an example of image capturing system. Server apparatus 100 is an example of camera control apparatus. GPS module 300 is an example of position sensor (latitude-and-longitude information acquiring unit) and altitude sensor (altitude information acquiring unit). CPU 102 is an example of controller. Interface 101 is an example of a communication circuit. First camera 400a and second camera 400b are an example of image capturing device. First actuator 401a and second actuator 401b are an example of camera orientation changing unit. Compass 500 is an example of azimuth sensor (azimuth information acquiring unit). Geographic information database 104 is an example of landmark database.

1-2 Operations

The operations of in-flight system 10 that is configured in the above-described manner will be described in the following. Server apparatus 100 acquires altitude information from GPS module 300. Server apparatus 100 drives first actuator 401a and second actuator 401b based on the altitude information to change the orientations (i.e., the image capturing directions) of first camera 400a and second camera 400b.

When a user gives an instruction to start image capturing by means of operating operation unit 105 of server apparatus 100, CPU 102 instructs first camera 400a and second camera 400b to start image capturing. First camera 400a and second camera 400b generate image data by performing an image capturing operation, and outputs the image data to server apparatus 100.

CPU 102 combines the image data acquired from first camera 400a and second camera 400b by carrying out image processing on the image data, and transmits the combined image data to monitor 200. Monitor 200 displays the acquired image data. First camera 400a and second camera 400b are disposed in such orientations that their respective angles of view (image capturing regions) partially overlap each other. By combining image data obtained by first camera 400a and second camera 400b that perform image capturing, CPU 102 can generate composite image data, which are image data with a wider angle of view.

In addition, CPU 102 changes the orientations of first camera 400a and second camera 400b based on the altitude information. CPU 102 repeats the above-described process every predetermined time until it receives an instruction to stop image capturing.

Figure 4:
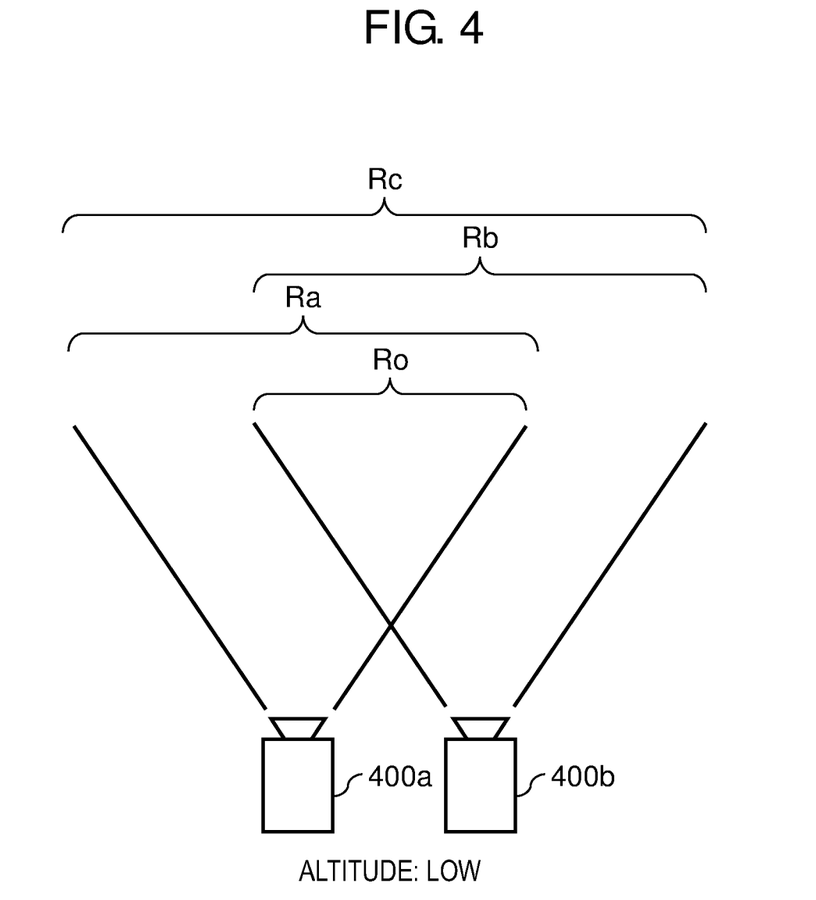
FIG. 4 is a view illustrating a specific example of the orientations of a first camera and a second camera in cases where the altitude of an aircraft is low, according to the first exemplary embodiment.
Figure 5:
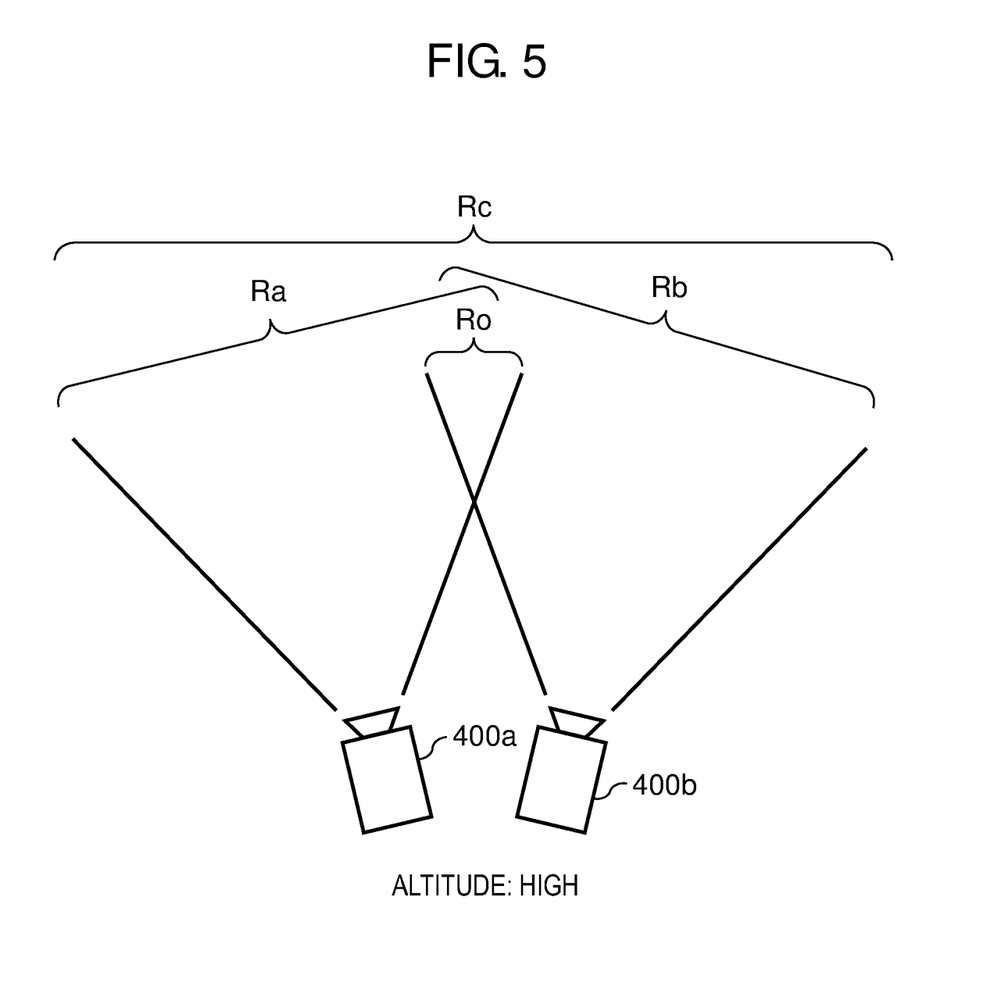
FIG. 5 is a view illustrating a specific example of the orientations of the first camera and the second camera in cases where the altitude of the aircraft is high, according to the first exemplary embodiment.

The following describes controlling of the orientations of first camera 400a and second camera 400b based on altitude information. FIG. 4 is a view illustrating a specific example of the orientations of first camera 400a and second camera 400b in cases where the altitude of the aircraft is low. FIG. 5 is a view illustrating a specific example of the orientations of first camera 400a and second camera 400b in cases where the altitude of the aircraft is high. CPU 102 drives first actuator 401a and second actuator 401b by transmitting a drive signal to first actuator 401a and second actuator 401b to control the image capturing directions of first camera 400a and second camera 400b so that composite image capturing region Rc is narrower when the altitude indicated by the altitude information is lower. Controlling of the image capturing directions of first camera 400a and second camera 400b may be carried out by changing the image capturing directions of both of the cameras, or by changing the image capturing direction of either one of the cameras.

Herein, composite image capturing region Rc is a wider image capturing region obtained by combining image capturing region Ra of first camera 400a and image capturing region Rb of second camera 400b. In other words, composite image capturing region Rc is a region in which image capturing is possible with at least one of the two cameras. It may also be said that the image capturing region of the composite image data, which are obtained by combining the image data obtained through the image capturing performed by first camera 400a and second camera 400b, is composite image capturing region Rc. An axis corresponding to the optical axis of composite image capturing region Rc is defined as a composite optical axis. The composite optical axis is the sum of unit vectors indicating the respective optical axes of the two cameras. It should be understood that the orientation of the composite optical axis can be obtained by calculation from the first directional information and the second directional information, which indicate the respective orientations of the two cameras, and the azimuth information acquired from compass 500.

As illustrated in FIG. 4, CPU 102 drives first actuator 401a and second actuator 401b to change the orientations of first camera 400a and second camera 400b so that composite image capturing region Rc of first camera 400a and second camera 400b will be smaller when the altitude indicated by the altitude information is lower than a predetermined threshold value. That the composite image capturing region Rc will be smaller means, in other words, that overlapping image capturing region Ro in which image capturing region Ra of first camera 400a and image capturing region Rb of second camera 400b overlap is larger.

As illustrated in FIG. 5, CPU 102 drives first actuator 401a and second actuator 401b to change the orientations of first camera 400a and second camera 400b so that composite image capturing region Rc of first camera 400a and second camera 400b will be larger when the altitude indicated by the altitude information is higher than a preset threshold value. That the composite image capturing region Rc will be larger means, in other words, that overlapping image capturing region Ro in which image capturing region Ra of first camera 400a and image capturing region Rb of second camera 400b overlap is smaller.

1-3 Advantageous Effects, Etc.

As described above, server apparatus 100 of the present exemplary embodiment includes interface 101 and CPU 102. Interface 101 receives first image data generated by first camera 400a that performs image capturing, second image data generated by second camera 400b that performs image capturing, and altitude information relating to altitude, which is output by GPS module 300, and interface 101 transmits a drive signal to first actuator 401a capable of changing the image capturing direction of first camera 400a and to second actuator 401b capable of changing the image capturing direction of the second camera 400b. CPU 102 outputs the drive signal for driving first actuator 401a and second actuator 401b to control the image capturing directions of first camera 400a and second camera 400b so that when the altitude indicated by the altitude information is lower, composite image capturing region Rc, which is the range in which image capturing is possible with at least one of first camera 400a and second camera 400b, will be narrower.

With this server apparatus 100, when the altitude is lower, composite image capturing region Rc obtained by the two cameras is accordingly narrower. When composite image capturing region Rc is narrower, the blind spot between the two cameras becomes smaller, so that the image capturing region contains a closer range. When the altitude is lower, the possibility that an object such as a landmark is in a closer range is higher. Even in such cases, server apparatus 100 of the present exemplary embodiment makes it possible to control the cameras orientations so as to increase the possibility that such objects are contained within the image capturing region. That is, server apparatus 100 of the present exemplary embodiment is effective to perform image capturing with an appropriate angle of view (i.e., with an appropriate image capturing region).

Second Exemplary Embodiment

Figure 6:
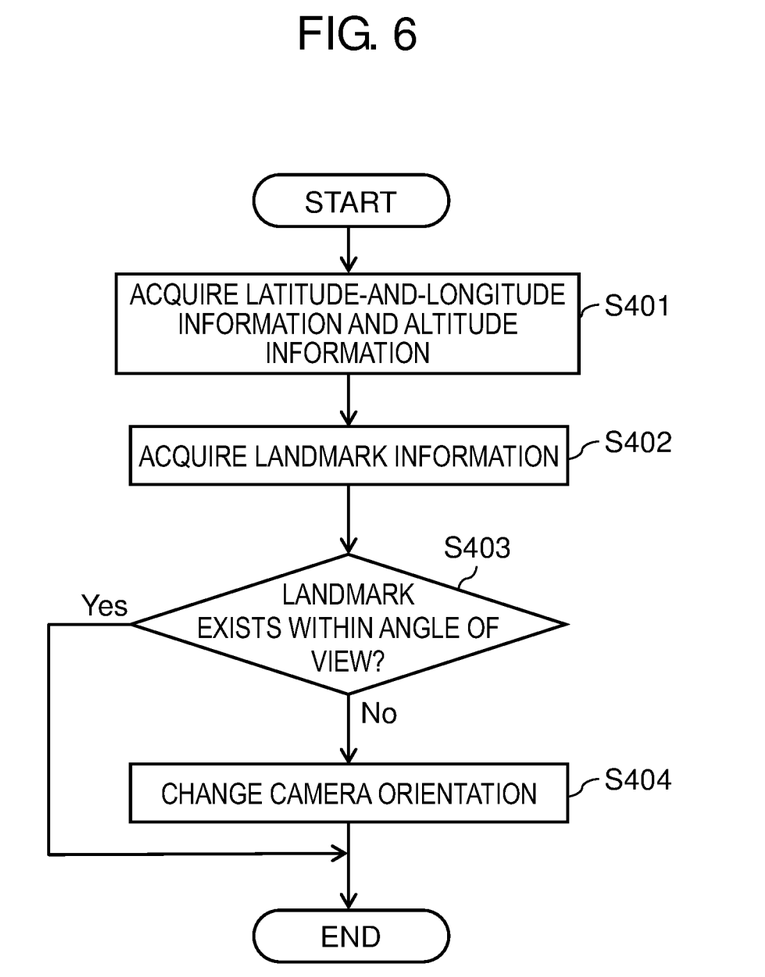
FIG. 6 is a flowchart illustrating a process for controlling the orientations of cameras according to a second exemplary embodiment.

Hereinbelow, a second exemplary embodiment will be described with reference to FIGS. 6 to 7.

2-1 Configuration

In-flight system 10 of the second exemplary embodiment differs from in-flight system 10 of the first exemplary embodiment in that the orientations of first camera 400a and second camera 400b are controlled based on landmark information. The structure of in-flight system 10 of the second exemplary embodiment and the basic controlling of the image capturing operations by first camera 400a and second camera 400b are substantially the same as those of in-flight system 10 of the first exemplary embodiment, and therefore, repetitive description thereof will be omitted.

2-2 Operations

Hereinbelow, controlling of the orientations of first camera 400a and second camera 400b based on the landmark information will be described. FIG. 6 is a flowchart illustrating a process for controlling the orientations of the cameras according to the second exemplary embodiment. CPU 102 repeats the process shown in FIG. 6 every certain time during the image capturing operation performed by first camera 400a and second camera 400b.

CPU 102 acquires latitude-and-longitude information and altitude information (step S401). Next, CPU 102 acquires landmark information in a region around the current position from geographic information database 104 (step S402). Specifically, CPU 102 first calculates distance d2 from the current position to the horizon based on the altitude information.

Figure 7:
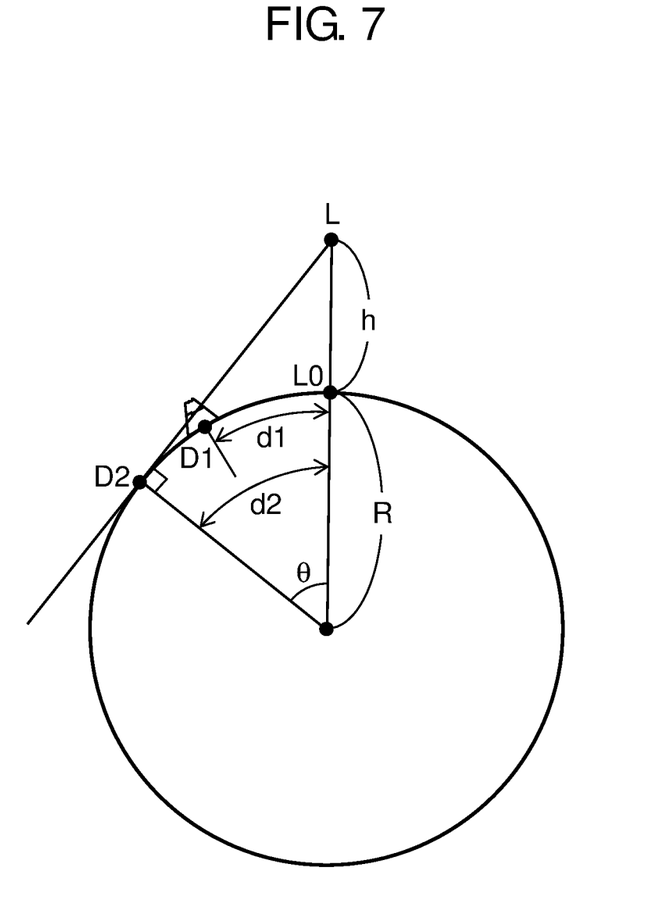
FIG. 7 is a view illustrating the relationship between a current position, a landmark position, and a horizon position, according to the second exemplary embodiment.

FIG. 7 is a view illustrating the relationship between current position L, landmark position D1, and horizon position D2. Current position L is the current position of the aircraft, in other words, the position indicated by the altitude information and the latitude-and-longitude information, which are output by GPS module 300. Ground surface position L0 is the position of the ground surface that is located directly beneath the aircraft, in other words, the position indicated by the latitude-and-longitude information, which is output by GPS module 300. Altitude H is the altitude of the aircraft, in other words, the altitude indicated by the altitude information, which is output by GPS module 300. Radius R is the radius of the Earth when the Earth is assumed to be a perfect sphere. Landmark position D1 is the global position of a specific landmark indicated by a piece of landmark information retained in geographic information database 104. Horizon position D2 is the position of the horizon as seen from the aircraft located at current position L.

Distance d1 from ground surface position L0 to landmark position D1 can be obtained by calculation using the longitudes and latitudes thereof. The central angle of an arc defined by ground surface position L0 and landmark position D1 is defined as angle θ. Distance d2 from ground surface position L0 to horizon position D2 can be obtained by the following equation (1). As will be appreciated from equation (1), distance d2 can be calculated from altitude H, in other words, the altitude information.

$$d2 = R\theta = R\cos^{-1}(R/(h+R)) \quad (1)$$

Next, CPU 102 acquires landmark information contained within a circular region with its center being ground surface position L0 indicated by the latitude-and-longitude information and its radius being the calculated distance d2, and within the maximum composite image capturing region of first camera 400a and second camera 400b, from geographic information database 104 (step S402). Here, the maximum composite image capturing region refers to the region in which composite image capturing region Rc that is determined by the orientations of the two cameras is the greatest. Specifically, the maximum composite image capturing region is composite image capturing region Rc that causes overlapping image capturing region Ro of first camera 400a and second camera 400b to be minimum. CPU 102 identifies the maximum composite image capturing region from the first directional information and the second directional information that cause overlapping image capturing region Ro of the two cameras to be minimum, the azimuth information acquired from compass 500, and the respective angles of view of the cameras. CPU 102 acquires landmark information that is present within an overlapping region between the circular region with its radius being distance d2 and the maximum composite image capturing region from geographic information database 104.

CPU 102 determines whether or not the acquired landmark information exists within at least one of image capturing region Ra of first camera 400a and image capturing region Rb of second camera 400b (step S403). In other words, CPU 102 determines whether or not the acquired landmark is present within composite image capturing region Rc.

If the landmark indicated by the acquired landmark information exists within at least one of image capturing region Ra of first camera 400a and image capturing region Rb of second camera 400b (Yes at step S403), the current camera orientations are retained.

On the other hand, if the landmark indicated by the acquired landmark information exists neither in image capturing region Ra of first camera 400a nor in image capturing region Rb of second camera 400b (No at step S403), CPU 102 drives first actuator 401a and second actuator 401b with a drive signal to change the camera orientations (step S404). In this case, CPU 102 changes the camera orientations so that the landmark indicated by the acquired landmark information exists in at least one of image capturing region Ra of first camera 400a and image capturing region Rb of second camera 400b, based on the position of the landmark identified by the acquired landmark information. When changing the image capturing directions of first camera 400a and second camera 400b, the image capturing directions of both cameras may be changed, or the image capturing direction of either one of the cameras may be changed.

2-3 Advantageous Effects, Etc.

As described above, server apparatus 100 of the present exemplary embodiment includes interface 101, geographic information database 104, and CPU 102. Interface 101 receives image data generated by first camera 400a that performs image capturing, image data generated by second camera 400b that performs image capturing, latitude-and-longitude information relating to the current position that is output by GPS module 300, and azimuth information that is output by compass 500. Interface 101 also transmits a drive signal to first actuator 401a capable of changing the image capturing direction of first camera 400a and to second actuator 401b capable of changing the image capturing direction of the second camera 400b. Geographic information database 104 retains landmark information relating to positions of landmarks. CPU 102 identifies a landmark positioned within a predetermined range relative to the current position, based on the latitude-and-longitude information, the azimuth information, and the landmark information acquired from geographic information database 104. Then, CPU 102 outputs the drive signal for driving first actuator 401a and second actuator 401b to control the image capturing directions of first camera 400a and second camera 400b so that the position of the identified landmark is contained in at least one of the image capturing region of first camera 400a and the image capturing region of second camera 400b.

This server apparatus 100 makes it possible to control the camera orientations so that a landmark existing within the range in which image capturing is possible can be caught within the image capturing region of either one of the cameras. Thus, server apparatus 100 of the present exemplary embodiment is effective to perform image capturing with an appropriate angle of view (i.e., with an appropriate image capturing region).

Other Exemplary Embodiments

Hereinabove, the first and second exemplary embodiments have been described as examples of the technology disclosed in the present application. However, the technology of the present disclosure is not limited thereto and may be applied to other embodiments in which modifications, substitutions, additions, and subtractions are made. It is also possible to construct other embodiments by combining component parts described in the first and second exemplary embodiments. Now, other exemplary embodiments will be illustrated in the following.

The first and second exemplary embodiments have described a configuration provided with two cameras. It is also possible to apply the configuration of the present disclosure to cases where three or more cameras are provided, by performing similar processing for two of the cameras.

The first and second exemplary embodiments have described a configuration in which the altitude information is acquired from GPS module 300. It is also possible to acquire the altitude information using other types of altitude sensors, such as an atmospheric pressure sensor.

The first and second exemplary embodiments have described a configuration in which the orientations of the cameras are changed by controlling the actuators to thereby changing the image capturing regions. It is also possible to change image capturing regions by using cameras that are capable of changing their image capturing regions, such as cameras provided with zoom lenses, and by controlling the image capturing regions of the cameras with CPU 102. Specifically, CPU 102 changes image capturing region Ra of first camera 400a and image capturing region Rb of second camera 400b so that overlapping image capturing region Ro, in which image capturing region Ra of first camera 400a and image capturing region Rb of second camera 400b overlap, will be larger (i.e., the angle of view will be wider) when the altitude indicated by the altitude information is lower than a preset threshold value. CPU 102 changes image capturing region Ra of first camera 400a and image capturing region Rb of second camera 400b so that overlapping image capturing region Ro, in which image capturing region Ra of first camera 400a and image capturing region Rb of second camera 400b overlap, will be smaller (i.e., the angle of view will be narrower) when the altitude indicated by the altitude information is higher than the preset threshold value.

In place of zooming with the use of zoom lenses, zooming may be carried out by performing image capturing with the use of a camera equipped with a wide-angle lens and cropping a portion of image data from image data with a wide range of image capturing region. By changing the image capturing region to be cropped according to the altitude, it is also possible to control the overlapping cropped image capturing region of first camera 400a and second camera 400b.

The first and second exemplary embodiments have described a configuration in which the image capturing regions are changed by controlling the actuators to pan or tilt the cameras. It is also possible that the image capturing regions may be changed by controlling the actuators so as to rotate the cameras in rolling directions, that is, to rotate the cameras around the optical axes of the cameras. The image capturing region (angle of view) of first camera 400a and second camera 400b is in a rectangular shape with an aspect ratio of, for example, 16:9. This means that the image capturing regions can be changed by rotating the cameras in rolling directions between a horizontal position and a vertical position. Here, the horizontal position refers to a position of the cameras along a rolling direction such that the longitudinal sides of the image capturing regions of the cameras are parallel to the axis along which the two cameras are lined up. The vertical position refers to a position of the cameras along a rolling direction such that the longitudinal sides of the image capturing regions of the cameras are perpendicular to the axis along which the two cameras are lined up.

For example, CPU 102 controls first actuator 401a and second actuator 401b to cause first camera 400a and second camera 400b to be in the horizontal position when the altitude indicated by the altitude information is lower than a preset threshold value. CPU 102 controls first actuator 401a and second actuator 401b to cause first camera 400a and second camera 400b to be in the vertical position when the altitude indicated by the altitude information is higher than the preset threshold value. In this situation, however, the image capturing regions of first camera 400a and second camera 400b should partially overlap. By doing so, the image capturing regions about the axis in which the cameras are lined up can be changed, so that the same advantageous effects as those obtained by the first exemplary embodiment can be obtained.

In place of controlling the actuators, it is possible to perform image capturing using cameras equipped with a wide-angle lens, and to crop a portion of image data from the image data with a wide range of image capturing region to achieve panning and tilting, or it is also possible to crop a portion of image data along a rolling direction.

The first exemplary embodiment has described a configuration in which only one threshold value is set for determining whether the altitude is high or low and the camera orientations are changed in two steps. It is also possible that a plurality of threshold values may be set and the camera orientations may be changed in three or more steps.

The first exemplary embodiment has described a configuration in which a threshold value of altitude is set in order to determine whether the altitude is high or low and the camera orientations are changed accordingly. It is also possible that a table showing associations between altitude information and camera orientations may be prepared, and the camera orientations may be decided from the altitude information by looking up the table.

The first exemplary embodiment has described a configuration in which a threshold value of altitude is set in order to determine whether the altitude is high or low and the camera orientations are changed accordingly. It is also possible that the camera orientations may be calculated using a predetermined calculation formula to change the camera orientations.

The first and second exemplary embodiments have described a configuration in which the process of controlling the camera orientations is repeated every certain time. This process may be repeated every time the aircraft travels a certain distance, using a travel distance acquired from GPS module 300.

The first and second exemplary embodiments have been described with the presumption that the orientations and image capturing regions of the cameras are changed in lateral directions (panning directions). The orientations and image capturing regions of the cameras may be changed in a similar manner when they are changed in vertical directions.

Hereinabove, exemplary embodiments have been described as examples of the technology of the present disclosure. For that purpose, the appended drawings and the detailed description have been provided.

Accordingly, the elements shown in the appended drawings and the detailed description may include not only the elements that are essential to solve the technical problem but also non-essential elements that are not necessary to solve the technical problem. Therefore, just because the appended drawings and the detailed description contain such non-essential elements, it should not be construed that such non-essential elements are necessary.

Moreover, the foregoing exemplary embodiments merely illustrate the technology of the present disclosure, and therefore, various modifications, substitutions, additions, and subtractions may be made within the scope of the claims and equivalents thereof.

INDUSTRIAL APPLICABILITY

The present disclosure makes it available a camera control apparatus that enables image capturing with an appropriate angle of view, and is therefore applicable to a camera control apparatus for use in, for example, aircraft and trains.

What is claimed is:

1. A camera control apparatus comprising:
an interface configured to receive first image data generated by a first camera configured to perform image capturing, second image data generated by a second camera configured to perform image capturing, and altitude information relating to altitude, the altitude information being output by an altitude sensor, and transmit a drive signal to a first actuator capable of changing an image capturing direction of the first camera and to a second actuator capable of changing an image capturing direction of the second camera; and
a controller configured to output the drive signal so as to drive at least one of the first actuator and the second actuator to the interface so that an image capturing region of composite image data in which the first image data and the second image data are combined is narrower when the altitude indicated by the altitude information is lower.

* * * * *